US008656334B2

(12) United States Patent
Alpert et al.

(10) Patent No.: US 8,656,334 B2
(45) Date of Patent: Feb. 18, 2014

(54) MULTIPLE THRESHOLD VOLTAGE CELL FAMILIES BASED INTEGRATED CIRCUIT DESIGN

(75) Inventors: Charles Jay Alpert, Austin, TX (US); Zhuo Li, Austin, TX (US); Arjen Alexander Mets, Yorktown Heights, NY (US); Ying Zhou, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 12/832,180

(22) Filed: Jul. 8, 2010

(65) Prior Publication Data
US 2012/0011482 A1  Jan. 12, 2012

(51) Int. Cl.
*G06F 17/50* (2006.01)
(52) U.S. Cl.
USPC ............ 716/127; 716/132; 716/133; 716/134
(58) Field of Classification Search
USPC ........... 716/54, 104, 106, 108, 109, 113, 120, 716/133, 134, 132, 127; 327/544
See application file for complete search history.

(56) References Cited

U.S. PATENT DOCUMENTS

| | | | |
|---|---|---|---|
| 7,093,208 B2 | 8/2006 | Williams et al. | |
| 7,114,134 B2 | 9/2006 | Zhang et al. | |
| 7,281,230 B2 * | 10/2007 | Chung et al. | 716/114 |
| 7,340,712 B2 | 3/2008 | Correale, Jr. | |
| 7,500,207 B2 | 3/2009 | Bhattacharya et al. | |
| 7,573,775 B2 * | 8/2009 | Fallah et al. | 365/227 |
| 7,653,885 B2 * | 1/2010 | Nandy et al. | 716/133 |
| 2009/0019417 A1 * | 1/2009 | Takeda | 716/18 |
| 2010/0070933 A1 * | 3/2010 | Quach | 716/2 |
| 2011/0126163 A1 * | 5/2011 | Habitz et al. | 716/108 |
| 2011/0163801 A1 * | 7/2011 | Chua-Eoan | 327/544 |

OTHER PUBLICATIONS

A. Srivastava, "Simultaneous Vt Selection and Assignment for Leakage Optimization," ISLPED'03, Seoul, Korea, Aug. 25-27, 2003.
T.-H. Wu et al., "A Parallel and Randomized Algorithm for Large-Scale Discrete Dual-Vt Assignment and Continuous Gate Sizing," ISLPED'08, Bangalore, India, Aug. 11-13, 2008.
Y. Liu et al., "A New Algorithm for Simultaneous Gate Sizing and Threshold Voltage Assignment," ISPD'09, San Diego, California, Mar. 29-Apr. 1, 2009.

\* cited by examiner

*Primary Examiner* — Jack Chiang
*Assistant Examiner* — Brian Ngo
(74) *Attorney, Agent, or Firm* — Garg Law Firm, PLLC; Rakesh Garg; Libby Z. Toub

(57) ABSTRACT

A method, system, and computer usable program product for multiple threshold voltage cell families (mVt families) based integrated circuit design are provided in the illustrative embodiments. The integrated circuit includes cells, and a cell includes an electronic component. A design process is initialized by using cells from the mVt families in the design. The cells from the mVt families are included in iterative manipulation of the design. The cells from the mVt families are further included in violation cleanup and subsequent steps of the design process. A version of the design is produced that is usable to implement the circuit with the cells from the mVt families.

17 Claims, 8 Drawing Sheets

6 LVt CELLS
2 HVt CELLS
1x WIRELENGTH

4 LVt CELLS
4 HVt CELLS
1.05x WIRELENGTH

| LATE TUNING 702 | LATE RECOVERY 704 | MULTI THRESHOLD VOLTAGE FAMILIES DESIGN 706 |
|---|---|---|
| 5 LVt CELLS | 6 LVt CELLS | 4 LVt CELLS |
| 6 HVt CELLS | 2 HVt CELLS | 4 HVt CELLS |
| 1.5 x WIRELENGTH | 1 x WIRELENGTH | 1.05 x WIRELENGTH |

|  | TOTAL POWER 754 | STATIC POWER 756 | DYNAMIC POWER 758 |
|---|---|---|---|
| LATE TUNING | 21.4 mW | 3.57 mW | 9.04 mW |
| LATE RECOVERY | 22.18 mW | 5.41 mW | 8.22 mW |
| MULTI THRESHOLD VOLTAGE FAMILIES DESIGN | 20.92 mW | 3.57 mW | 8.66 mW |

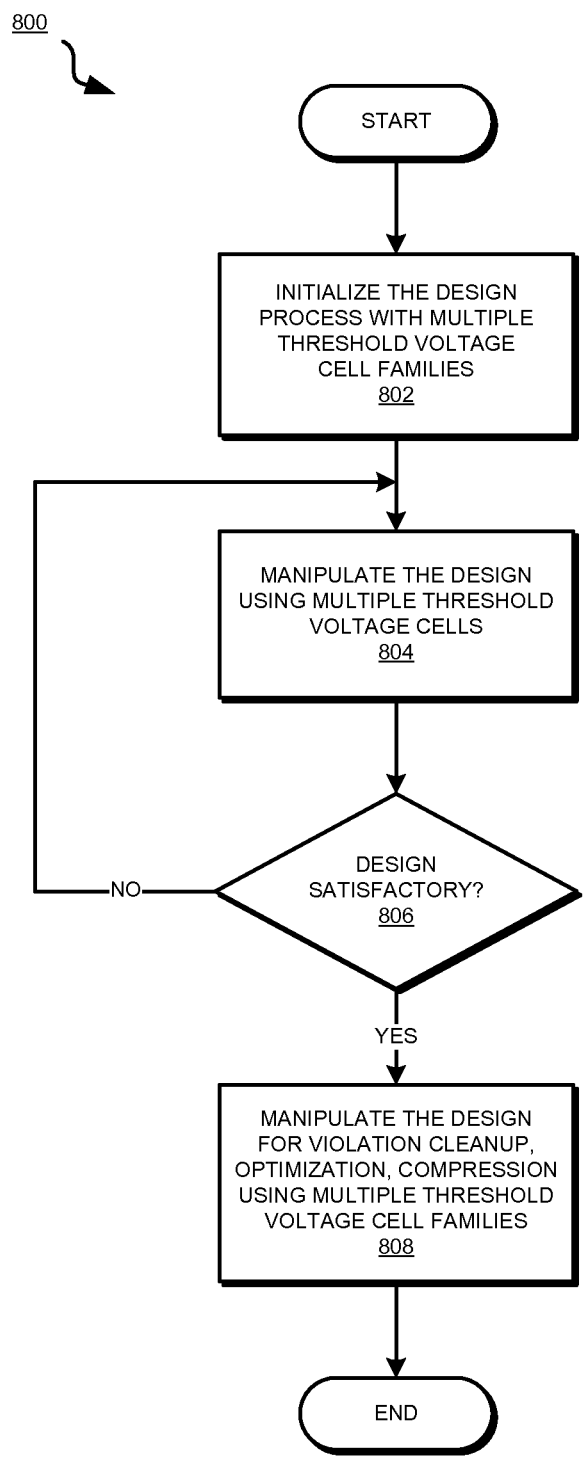

MULTIPLE THRESHOLD VOLTAGE CELL FAMILIES BASED INTEGRATED CIRCUIT DESIGN

BACKGROUND OF THE INVENTION

1. Field of the Invention

The present invention relates generally to an improved data processing system, and in particular, to a computer implemented method for integrated circuit design. Still more particularly, the present invention relates to a computer implemented method, system, and computer usable program code for multiple threshold voltage cell families (mVt families) based integrated circuit (IC) design.

2. Description of the Related Art

Modern day electronics include components that use integrated circuits. Integrated circuits are electronic circuits formed using Silicon as a substrate and by adding impurities to form solid-state electronic devices, such as transistors, diodes, and resistors. Commonly known as a "chip," an integrated circuit is generally encased in hard plastic. The components in modern day electronics generally appear to be rectangular black plastic pellets with connector pins protruding from the plastic encasement.

Circuit designers use a variety of software tools to design electronic circuits that accomplish an intended task. For example, a digital circuit may be designed to accept digital inputs, perform some computation, and produce a digital output. An analog circuit may be designed to accept analog signals, manipulate the analog signals, such as my amplifying, filtering, or mixing the signals, and produce an analog or digital output. Generally, any type of circuit can be designed as an IC.

The software tools used for designing ICs produce, manipulate, or otherwise work with the circuit layout at very small scales. Some of the components that such a tool may manipulate may only measure tens of nanometer across when formed in Silicon. The designs produced and manipulated using these software tools are complex, often including hundreds of thousands of such components interconnected to form an intended electronic circuitry.

The software tools manipulate these components at the components level, or blocks of components level. A block of components is also known as a cell. A cell in an IC design is a portion of the IC design. One way of identifying cells in an IC design is to overlay a grid of imaginary vertical and horizontal lines on the design, and deeming each portion of the IC design bound by horizontal and vertical lines as a cell. Cells formed in this manner are commonly known as global routing cells, or g-cells. Imposing such a grid on an IC design abstracts the global routing problem away from the actual wire implementation and gives a more mathematical representation of the task.

An IC design software tool can, among other functions, manipulate cells, or interconnect components of one cell with components of other cells. The interconnects between components are called wires. A wire is a connection between parts of electronic components, and is formed using a metallic material that conducts electricity.

Placement problem is the problem of placing the cells of a chip such that the design meets all the design parameters of the chip. Routing is the process of connecting the pins after placement. In other words, placement results in a rendering of the components of various cells as being located in certain positions in the design, whereas routing results in a rendering of how the metal layers would be populated with that placement.

A wire can be designed to take any one of the several available paths in a design. Placement of a wire on a certain path, or track, is a part of routing.

Router is a component of IC design tools that performs the routing function. Once the placement component—known as a placer—has performed the placement function, the router attempts to connect the wires without causing congestion. For example, if a design parameter calls for no more than five wires in a given area, the router attempts to honor that restriction in configuring the wiring. Such limitations on the wiring are a type of design constraints and are called congestion constraints. Other types of design constraints may include, for example, blocked areas—cell areas where wires may not be routed.

Global routing is the process of connecting pins of one cell to the pins of other cells. In other words, global routing is the process of connecting the cells with one another. Detailed routing is the process of connecting the components within cells with one another. A type of router—known as the global router—performs the global routing. Another type of router—known as the detailed router—performs the detailed routing. The global and detailed routing produced during the design process is usually further modified during optimization of the design.

Physical synthesis is a process of designing the circuit by placing the required cells and optimizing the locations of the cells and the wires so that the design meets certain design requirements. For example, cells may have to be moved closer during physical synthesis to overcome a longer than desirable delay. As another example, buffers may be introduced or resized to overcome a slew or timing problem.

A threshold voltage is a voltage required to operate a component in a circuit. For example, a metal oxide field effect transistor (MOSFET) has a gate that operates at a threshold voltage. When the threshold voltage or a higher voltage is applied to the gate the MOSFET is turned on and provides a conductive path. When the voltage applied to the gate is below the threshold voltage the MOSFET is turned off.

A low threshold voltage (LVt) cell is a cell that operates in the desired manner at a threshold voltage that is lower than a specified voltage. Different LVt cells may operate at different voltage levels below the specified voltage. Accordingly, more than one family of LVt cells may exist such that a first family of LVt cells operates at a first threshold voltage a second family of LVt cells operates at a second threshold voltage, the first and the second threshold voltages both being lower than the specified voltage by different amounts. A family of cells is a collection of cells where the cell circuits may provide different functions but all cells in a family operate at a common threshold voltage.

Similarly, a high threshold voltage (HVt) cell is a cell that operates in the desired manner at a threshold voltage that is higher than the specified voltage. More than one family of HVt cells may exist such that a first family of HVt cells operates at a first threshold voltage a second family of HVt cells operates at a second threshold voltage, the first and the second threshold voltages both being higher than the specified voltage by different amounts.

SUMMARY OF THE INVENTION

The illustrative embodiments provide a method, system, and computer usable program product for multiple threshold voltage cell (mVt) families based integrated circuit design where the integrated circuit includes cells, and a cell includes an electronic component. An embodiment initializes a design process by using cells from the mVt families in the design.

The embodiment includes the cells from the mVt families in iterative manipulation of the design. The embodiment further includes the cells from the mVt families in violation cleanup and subsequent steps of the design process. The embodiment produces a version of the design usable to implement the circuit with the cells from the mVt families.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 7A depicts a table comparing certain aspects of designs created using prior art late tuning method, prior art late recovery method, and a method according to an illustrative embodiment;

FIG. 7B depicts a table comparing certain test results of designs created using the late tuning method, the late recovery method, and a method according to an illustrative embodiment;

FIG. 8 depicts a flowchart of a process of mVt families based IC design in accordance with an illustrative embodiment.

DETAILED DESCRIPTION OF THE PREFERRED EMBODIMENT

Figure 1:
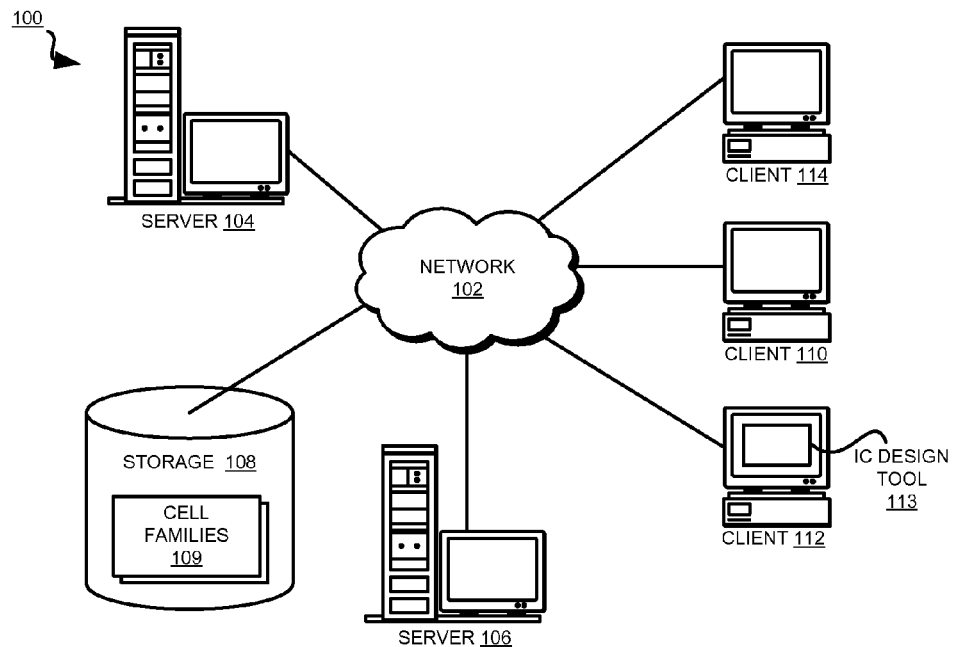
FIG. 1 depicts a pictorial representation of a network of data processing systems in which illustrative embodiments may be implemented.

In a portion of the IC design process, IC design tools generally employ various steps in producing an IC design that works as intended. A circuit designer generally creates the design in a computer programming language in the form of code. The IC design tool accepts the design in the code form and generates a rendering of the design in multiple layers that have be formed in a semiconducting material to create a circuit according to that design.

The IC design tool selects and places cells from one family in the design. The IC design tool manipulates a set of the cells iteratively to reach a satisfactory design. A set of cells is one or more cells.

Once a satisfactory design is reached, any design violations are cleared and the design is further manipulated to adjust the timing and slew characteristics of the signals between certain cells.

For example, minimizing the length of a wire in a given design is a design consideration in the design of the IC. As the wire length increases between two points increases, so does the delay in the signal being transmitted over the wire between the two points. To meet the timing requirement of signal, to with, to keep the delay within a specified limit, buffers are introduced along the wire length. A buffer may be an inverter or another component that reduces the delay between two points in a circuit.

The invention recognizes that present process of physical synthesis initializes and iterates through a design using a single family of cells. Only after the satisfactory design is reached and violations have been removed, does the present physical synthesis process incorporate cells from different families to adjust the slew and timing characteristics of parts of the design.

The invention further recognizes that different threshold voltages impart different characteristics to the cells that operate at those threshold voltages. For example, LVt cells are faster than an HVt cell of comparable functionality. In other words, a signal is delayed less through the LVt cell as compared to the delay through a comparable HVt cell.

However, power leakage in an LVt cell is greater compared to the power leakage in a comparable HVt cell. Power leakage is also known as static power. Minimizing power leakage is a desirable objective of an IC design. In some instances, an LVt cell can have up to five times the power leakage compared to the power leakage of a comparable HVt cell.

The invention recognizes that the selection of LVt cell family over an HVt cell family, or vice versa, to initiate and iteratively improve a design in present physical synthesis process is usually a conscious trade-off decision. The designer presently has to decide whether to trade smaller delay for larger leakage, or vice versa, and select the appropriate LVt or HVt cell family for physical synthesis.

The invention recognizes that initializing and iteratively manipulating an IC design using a single family of cells leads to an overall inferior design even after the violations are cleared and timing and slew requirements have been met. For example, the dynamic power usage of the final design is still higher than desirable for designs produced using the present physical synthesis process. Dynamic power is the reactive component of the power that is a wasted due to the capacitance resulting from the wire length and the area of the circuit. For example, the larger the number of cells in a design, the more area they occupy.

The invention further recognizes that the present physical synthesis process produces design that includes more cells than may be necessary or desirable, longer wire lengths than may be necessary or desirable, or both. Thus, the invention recognizes the use of a single family of cells for initiating and iteratively improving a design is a drawback of the present physical synthesis process.

To address these and other related problems in present physical synthesis process, the illustrative embodiments provide a method, computer usable program product, and data processing system for mVt families based integrated circuit design. Using the illustrative embodiments, an IC design tool can be improved to make use of multiple families of threshold voltage cells for beginning and improving the design. In other words, an IC design tool can be improved using an embodiment of the invention to select cells from more than one family of cells, such as by using an LVt family and an HVt family during the iterative manipulation and improvement of the design, as well as during the after-cleanup optimization and compression steps of the physical synthesis process.

Using the illustrative embodiments, the improved physical synthesis process may have better dynamic power and wire length metrics as compared to the routing solution for the same design created using prior art single-family physical synthesis process.

The examples in this disclosure are used only for the clarity of the description and are not limiting on the illustrative embodiments. Additional operations, actions, tasks, activities, and manipulations will be conceivable from this disclosure and the same are contemplated within the scope of the illustrative embodiments.

The illustrative embodiments are described using specific code, designs, layouts, schematics, and tools only as examples and are not limiting on the illustrative embodiments. The illustrative embodiments may be implemented with respect to any type of design data and any type of circuit that can be produced using an IC design tool.

Furthermore, the illustrative embodiments are described in some instances using particular software tools, processes, and data processing environments only as an example for the clarity of the description. The illustrative embodiments may be used in conjunction with other comparable or similarly purposed processes, systems, applications, or architectures. For example, some embodiments may be described using a physical synthesis process but are similarly applicable to any single family IC design methodology within the scope of the invention.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
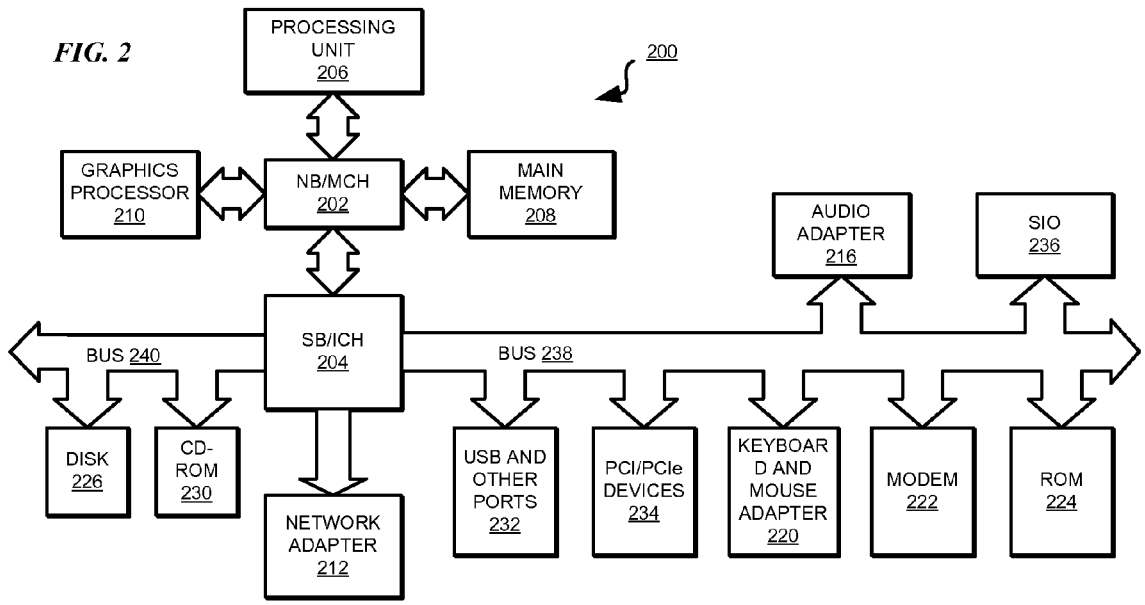
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may have software applications or software tools executing thereon. For example, client 112 may include IC design tool 113. IC design tool 113 may utilize a family from cell families 109 in storage 108 for physical synthesis.

Servers 104 and 106, storage units 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer-implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
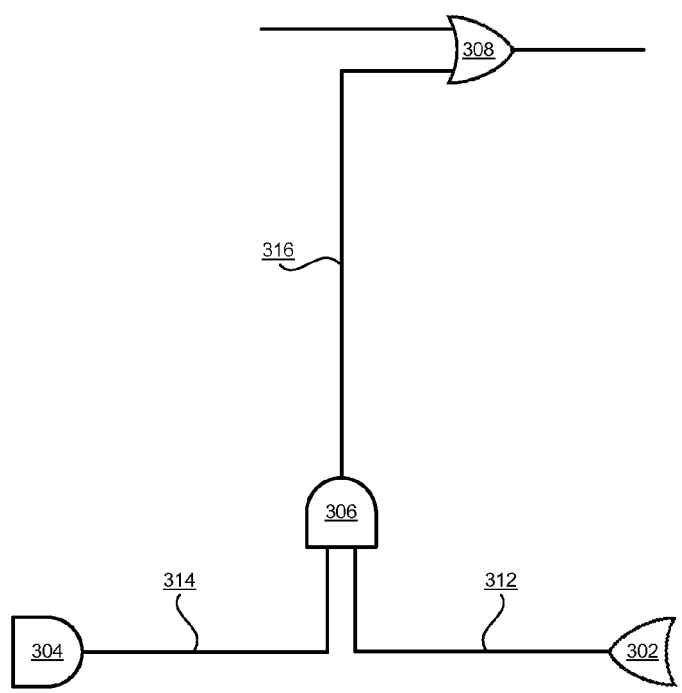
FIG. 3 depicts an example circuit that may have to be designed using an IC design tool, such as IC design tool 113 in FIG. 1.

With reference to FIG. 3, this figure depicts an example circuit that may have to be designed using an IC design tool, such as IC design tool 113 in FIG. 1.

Design 300 is a simple logic circuit selected only for the clarity of the description and is not intended to be limiting on the invention. In design 300, OR gate 302 and AND gate 304 drive AND gate 306. Output of AND gate 306 forms an input of OR gate 308. Wire 312 is of a certain wirelength and couples the output of OR gate 302 with an input on AND gate 306. Wire 314 is of a certain wirelength and couples the output of AND gate 304 with an input on AND gate 306. Wire 316 is of a certain wire length and couples the output of AND gate 306 with an input on OR gate 308.

Figure 4A:
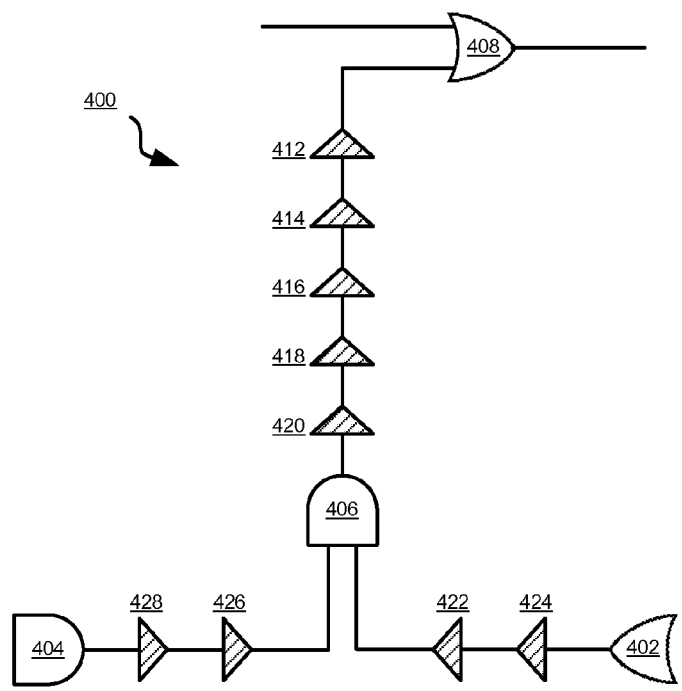
FIG. 4A depicts a state of design after an example iteration of an IC design, such as design 300 in FIG. 3.

With reference to FIG. 4A, this figure depicts a state of design after an example iteration of an IC design, such as design 300 in FIG. 3. The iteration may be carried out by an IC design tool implementing a physical synthesis process, such as IC design tool 113 in FIG. 1.

Gates 402, 404, 406, and 408 in design 400 correspond to gates 302, 304, 306, and 308 respectively in FIG. 3. A present physical synthesis process may employ a late tuning method whereby the design is initiated with all HVt cells and some HVt cells are replaced with corresponding LVt cells only after the timing and slew characteristics are brought within specification after all design iterations have been executed and violations are cleared up.

Example design 400 of FIG. 4A is created using the late tuning method. Accordingly, buffers 412, 414, 416, 418, 420, 422, 424, 426, and 428 are all HVt buffers. Buffers 412, 414, 416, 418, and 420 may be inserted between gate 406 and gate 408, such as to facilitate reducing delay or slew later. Buffers 422 and 424 are similarly inserted between gates 402 and 406. Buffers 426 and 428 are similarly inserted between gates 404 and 406.

Figure 4B:
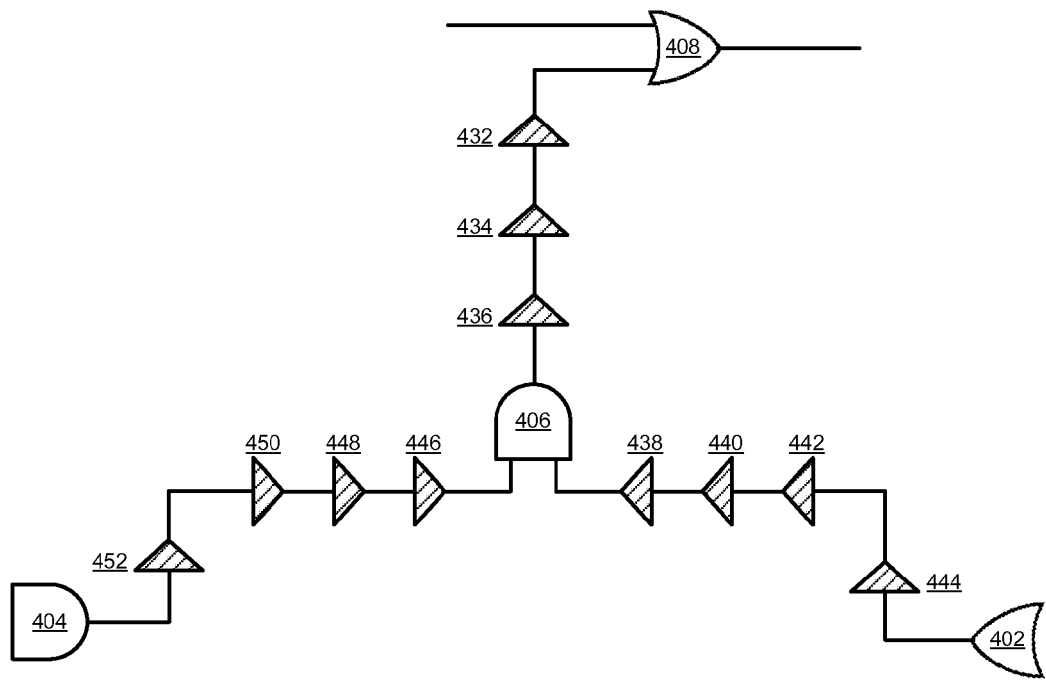
FIG. 4B depicts a state of design after another example iteration for improving an IC design, such as design 400 in FIG. 4A.

With reference to FIG. 4B, this figure depicts a state of design after another example iteration for improving an IC design, such as design 400 in FIG. 4A. The iteration may be carried out by an IC design tool implementing a physical synthesis process, such as IC design tool 113 in FIG. 1. Gates 402-408 are the same as in FIG. 4A.

Example design 400 is created in FIG. 4A and is modified in FIG. 4B using the late tuning method. Accordingly, buffers 432, 434, 436, 438, 440, 442, 444, 446, 448, 450, and 452 are all HVt buffers. Some of buffers 432-452 may correspond to buffers 412-428 in FIG. 4A, and others may be newly inserted in FIG. 4B.

The designer may determine that the delay between output of gate 406 and the input of gate 408 is still greater than desired. Accordingly, the wirelength between gate 406 and 408 has to be reduced. The designer moves gate 406 closer to gate 408 to reduce that wirelength. Moving gate 406 closer to gate 408 to reduce the wirelength between them, however, increases the distance (and consequently the wirelengths) between gates 402 and 406, and gates 404 and 406 as compared to the previous iteration in FIG. 4A.

Fewer buffers, namely, buffers 432, 434, and 436, are configured between gate 406 and gate 408 to accommodate the smaller wirelength between gates 406 and 408. More buffers, namely, buffers 438, 440, 442, and 444, are configured between gates 402 and 406 to limit the delay due to the larger wirelength between gates 402 and 406. More buffers, namely, buffers 446, 448, 450, and 452, are similarly configured between gates 404 and 406 to limit the delay due to the larger wirelength between gates 404 and 406.

Figure 4C:
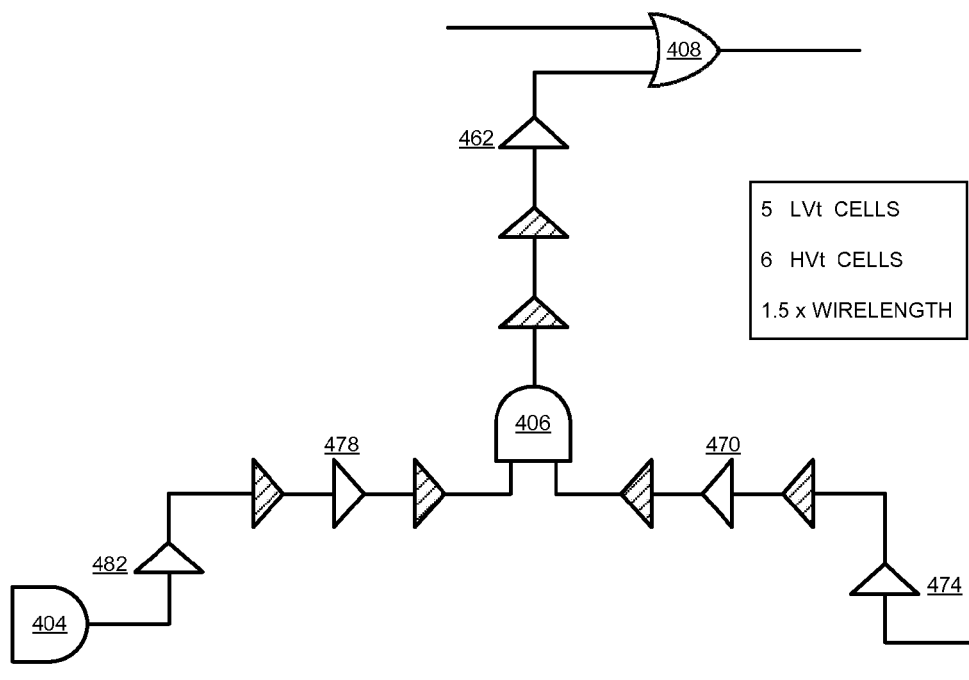
FIG. 4C depicts a state of design after late tuning step for improving an IC design, such as design 400 in FIG. 4A.

With reference to FIG. 4C, this figure depicts a state of design after late tuning step for improving an IC design, such as design 400 in FIG. 4A. The iteration may be carried out by an IC design tool implementing a physical synthesis process, such as IC design tool 113 in FIG. 1. Gates 402-408 are the same as in FIG. 4A. Example design 400 is created in FIG. 4A and is modified in FIG. 4B using the late tuning method.

Because buffers 432-452 are all HVt buffers, they each have greater delays than corresponding LVt buffers and eleven of them are needed where fewer than eleven could not achieve the same total delay. FIG. 4C illustrates the result of the late tuning step whereby some of the HVt buffers are replaced by LVt buffers to further improve the timing of circuit 400.

For example, HVt buffer 432 in FIG. 4B is swapped for LVt buffer 462. HVt buffers 440, 444, 448, and 452 in FIG. 4B are similarly swapped for LVt buffers 470, 474, 478, and 482 respectively in FIG. 4C.

The design in FIG. 4C includes five LVt buffer cells, six HVt buffer cells, and approximately one hundred and fifty percent of the wirelength in FIG. 4A. The overall design resulting in FIG. 4C may have improved delay characteristics over the design in FIG. 4B. However, because the design initiated with all HVt cells, the design of FIG. 4C may still use more area and more wirelength than necessary to achieve the characteristics of that design. Consequently, the design in FIG. 4C may suffer from higher congestion and dynamic power usage than necessary to achieve the characteristics of that design.

Figure 5A:
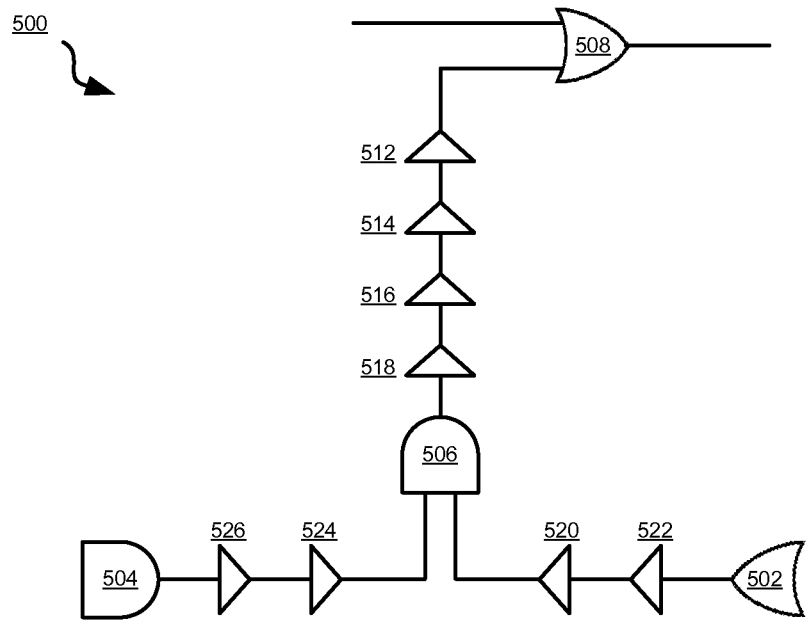
FIG. 5A depicts a state of design after an example iteration of an IC design, such as design 300 in FIG. 3.

With reference to FIG. 5A, this figure depicts a state of design after an example iteration of an IC design, such as design 300 in FIG. 3. The iteration may be carried out by an IC design tool implementing a physical synthesis process, such as IC design tool 113 in FIG. 1.

Gates 502, 504, 506, and 508 in design 500 correspond to gates 302, 304, 306, and 308 respectively in FIG. 3. A present physical synthesis process may employ a late recovery method whereby the design is initiated with all LVt cells and some LVt cells are replaced with corresponding HVt cells only after the timing and slew characteristics are brought within specification after all design iterations have been executed and violations are cleared up.

Example design 500 of FIG. 5A is created using the late recovery method. Accordingly, buffers 512, 514, 516, 518, 520, 522, 524, and 526 are all LVt buffers. Buffers 512, 514, 516, and 518 may be inserted between gate 506 and gate 508, such as to facilitate reducing delay or slew later. Buffers 520 and 522 are similarly inserted between gates 502 and 506. Buffers 524 and 526 are similarly inserted between gates 504 and 506.

Figure 5B:
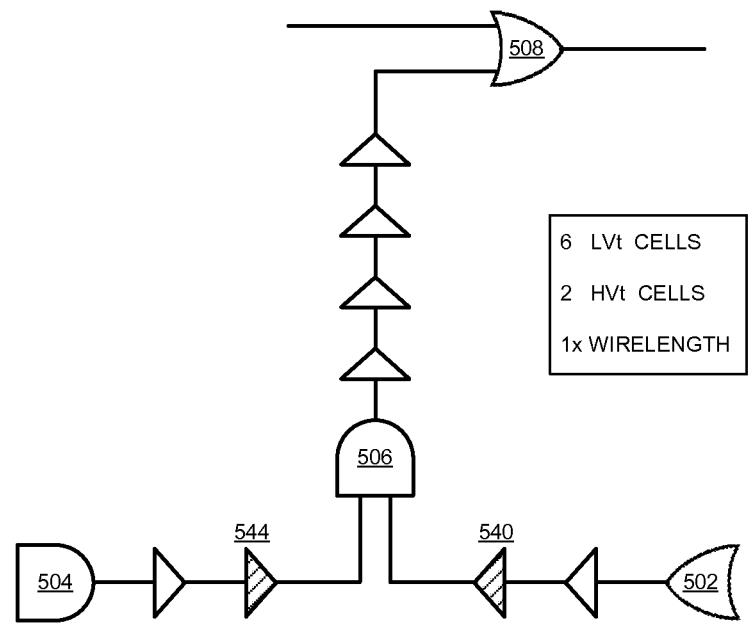
FIG. 5B depicts a state of design after another example iteration for improving an IC design, such as design 500 in FIG. 5A.

With reference to FIG. 5B, this figure depicts a state of design after another example iteration for improving an IC design, such as design 500 in FIG. 5A. The iteration may be carried out by an IC design tool implementing a physical synthesis process, such as IC design tool 113 in FIG. 1. Gates 502-508 are the same as in FIG. 5A.

Because buffers 512-526 are all LVt buffers, they each have greater leakage than corresponding HVt buffers even though only nine of them are needed where eleven could achieve the same total delay as in FIG. 4B. FIG. 5B illustrates the result of the late recovery step whereby some of the LVt buffers are replaced by HVt buffers to further reduce the leakage power of circuit 500.

For example, LVt buffer 520 in FIG. 5A is swapped for HVt buffer 540. LVt buffer 524 in FIG. 5A is similarly swapped for HVt buffer 544 in FIG. 5B.

The design in FIG. 5B includes six LVt buffer cells, two HVt buffer cells, and approximately the same wirelength as in FIG. 5A. The overall design resulting in FIG. 5B may have improved leakage power characteristics over the design in FIG. 5A. However, because the design initiated with all LVt cells, the design of FIG. 5B may still have more leakage power than necessary to achieve the characteristics of that design.

Figure 6A:
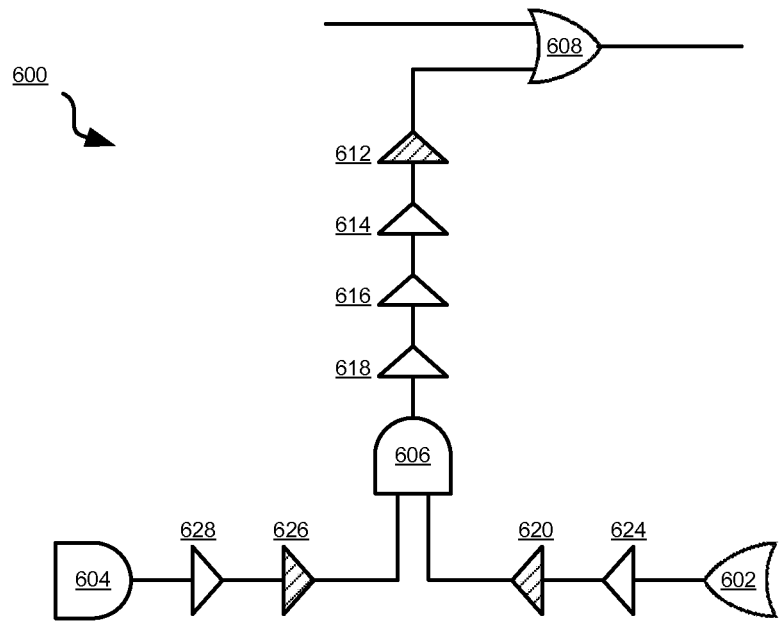
FIG. 6A depicts a state of design after initiating an IC design in accordance with an illustrative embodiment.

With reference to FIG. 6A, this figure depicts a state of design after initiating an IC design in accordance with an illustrative embodiment. The design may be performed according to an improved physical synthesis process in a design tool such as IC design tool 113 in FIG. 1 improved according to an embodiment. The state depicted in this figure may be achieved using design 300 in FIG. 3. Gates 602, 604, 606, and 608 in design 600 correspond to gates 302, 304, 306, and 308 respectively in FIG. 3.

An embodiment may cause a physical synthesis process to select cells, such as buffer cells, from multiple families of cells. For example, an improved physical synthesis process may initiate the design with some LVt buffers cells and some HVt buffer cells. Further some LVt cells may be swapped for corresponding HVt cells, and vice versa, after the timing and slew characteristics are brought within specification after all design iterations have been executed and violations are cleared up.

Buffers from only two families are depicted only as an example and are not intended to be limiting on the invention. An embodiment may cause the improved physical synthesis process to select cells from two or more families, for example, from two LVt families and three HVt families simultaneously. Any number of families may contribute cells of any type and number to the improved physical synthesis process without limitation.

Example design 600 of FIG. 6A is created using a physical synthesis process that has been improved according to an embodiment. Accordingly, buffers 612, 620 and 626 are HVt buffers and buffers 614, 616, 618, 624, and 628 are LVt buffers. Buffers are inserted between gates to facilitate reducing delay or slew later as described above.

Figure 6B:
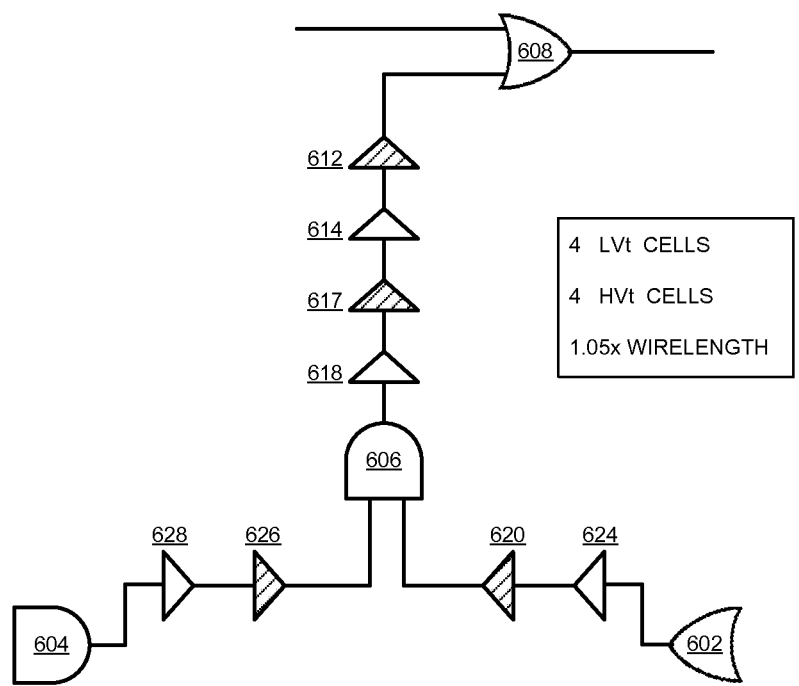
FIG. 6B depicts a state of design after an example iteration for improving an IC design in accordance with an illustrative embodiment.

With reference to FIG. 6B, this figure depicts a state of design after an example iteration for improving an IC design in accordance with an illustrative embodiment. The design depicted in this figure is an improvement over design 600 in FIG. 6A. The iteration may be carried out by an IC design tool implementing a physical synthesis process, such as IC design tool 113 in FIG. 1. Gates 602-608 are the same as in FIG. 6A.

At one iteration designer using the improved physical synthesis process may determine that the delay between output of gate 606 and the input of gate 608 is still not sufficient. The wirelength between gate 606 and 608 has to be reduced. The designer may move gate 606 closer to gate 608 to reduce that wirelength such that the total delay between gates 606 and 608 is satisfied sufficiently within a specified delay limit such that gate 616 of FIG. 6A may be swapped for gate 617 in the iteration of FIG. 6B.

Because the delay between gates 606 and 608 is sufficiently within a specified delay limit, gate 616 of FIG. 6A may be swapped for gate 617 in the iteration of FIG. 6B. Now the total delay between gates 606 and 608 remains the same but leakage power is reduced due to HVt buffer 617.

However, the move of gate 606 and the reduction in wirelength between gates 606 and 608 are not as great as the move and reduction in FIG. 4B. Therefore, moving gate 606 closer to gate 608 to reduce the wirelength between them increases the distance (and consequently the wirelengths) between gates 602 and 606, and gates 604 and 606 only slightly as compared to the previous iteration in FIG. 6A.

The design in FIG. 6B includes four LVt buffer cells, four HVt buffer cells, and only approximately one hundred and five percent of the wirelength as in FIG. 6A. The overall design resulting in FIG. 6B has improved leakage power characteristics over the design in FIG. 6A. Because the design initiated with a mix of HVt and LVt cells according to an embodiment, the design of FIG. 6B may demonstrate a better balance between leakage power, congestion, wirelength, and dynamic power than the designs in FIG. 4C or 5B.

With reference to FIG. 7A, this figure depicts a table comparing certain aspects of designs created using prior art late tuning method, prior art late recovery method, and a method according to an illustrative embodiment. Table 700 shows the cell counts and wirelengths in FIG. 4C according to the late tuning method in column 702. Cell counts and wirelengths in FIG. 5B according to the late recovery method are shown in column 704. Cell counts and wirelengths in FIG. 6B according to an illustrative embodiment are shown in column 706. All designs are implementations of the circuit depicted in FIG. 3.

Late tuning design of FIG. 4C resulted in five LVt cells and six HVt cells—a total area of eleven cells. The wirelength there was approximately one hundred fifty percent of the wirelength in the initial design in FIG. 4A.

Late recovery design of FIG. 5B resulted in six LVt cells and two HVt cells—a total area of eight cells. The wirelength there was approximately the same as the wirelength in the initial design in FIG. 5A.

The design according to an illustrative embodiment in FIG. 6B resulted in four LVt cells and four HVt cells—a total area of eight cells. The wirelength there was approximately one hundred and five percent of the wirelength in the initial design in FIG. 6A.

With reference to FIG. 7B, this figure depicts a table comparing certain test results of designs created using the late tuning method, the late recovery method, and a method according to an illustrative embodiment. Table 750 shows the total power consumed by a design in column 752. Static power (leakage power) of a design is shown in column 754. Dynamic power used in a design shown in column 756. All designs are implementations of the same circuit.

According to the test results, the design according to an illustrative embodiment achieves dynamic power value between the dynamic power values of the late tuning design and the late recovery design. The design according to an illustrative embodiment achieves the lower of the static power of the late tuning design and the late recovery design. The design according to an illustrative embodiment achieves a total power consumption that is lower than the total power consumptions of the late tuning design and the late recovery design.

Thus, advantageously, a design according to an illustrative embodiment may reduce dynamic power as compared to a design of the same circuit using late tuning method. The design according to an illustrative embodiment may not increase the static power, and may actually reduce the total power consumption of the circuit as compared to designs using prior art methods.

With reference to FIG. 8, this figure depicts a flowchart of a process of mVt families based IC design in accordance with an illustrative embodiment. Process 800 may be implemented in an IC design tool, such as IC design tool 113 in FIG. 1.

Process 800 begins by initializing the design process, such as a physical synthesis process, with mVt families (step 802). Process 800 manipulates the design using cells from two or more of the mVt families (step 804).

Process 800 determines whether the design is satisfactory (step 806). For example, process 800 may determine whether the design after the manipulations of step 804 is within certain design parameters.

If the design is not satisfactory ("No" path of step 806), process 800 returns to step 804 for another iteration of the manipulations. If the design is satisfactory ("Yes" path of step 806), process 800 further manipulates the design for cleaning up any violations, optimization, and/or compression using some or all of the mVt families from step 802 (step 808). Process 800 may end thereafter.

In performing the iterations through step 804, process 800 may be further configured to respect budget constraints (not shown). For example, a design may have to be produced such that no more than twenty percent of the design area is occupied by LVt cells. With a total budget of twenty percent, an iteration of step 804 may decide not to use all of the budget, but only a fraction of it for some number of iterations.

For example, in one iteration, process 800 may restrict LVt cells to only five percent of the design area. With a budget of five percent, certain number of cells may be selected from an LVt family and certain number of cells, perhaps more than LVt cells, may be selected from an HVt family.

In the next or a subsequent iteration, process 800 may increase the budget to ten percent, fifteen percent, or up to the total budgeted area of twenty percent. This increase may allow an iteration of step 804 to use, replace, substitute, or add more LVt cells (and perhaps remove some HVt cells) in the iteration. For example, process 800 may substitute some HVt cells with equivalent LVt cells on critical paths in the design where the delay timing is critical to the circuit's operation.

Thus, process 800 can change the mix of cells from different cell families in different iterations within the scope of the invention. Of course, if desired, process 800 can begin an iteration with all twenty percent of the budgeted area available to LVt cells and maintain that budget until the design is satisfactory. Conversely, process 800 may replace an LVt cell with an equivalent HVt cell for a noncritical path to reduce the overall leakage power metric of the circuit.

Thus, process 800 advantageously starts the design process with mVt families as opposed to single-family based design processes currently available. Process 800 also advantageously ensures that the iterations of design modifications continue to use mVt families according to a fixed or variable budget.

Figure 9:
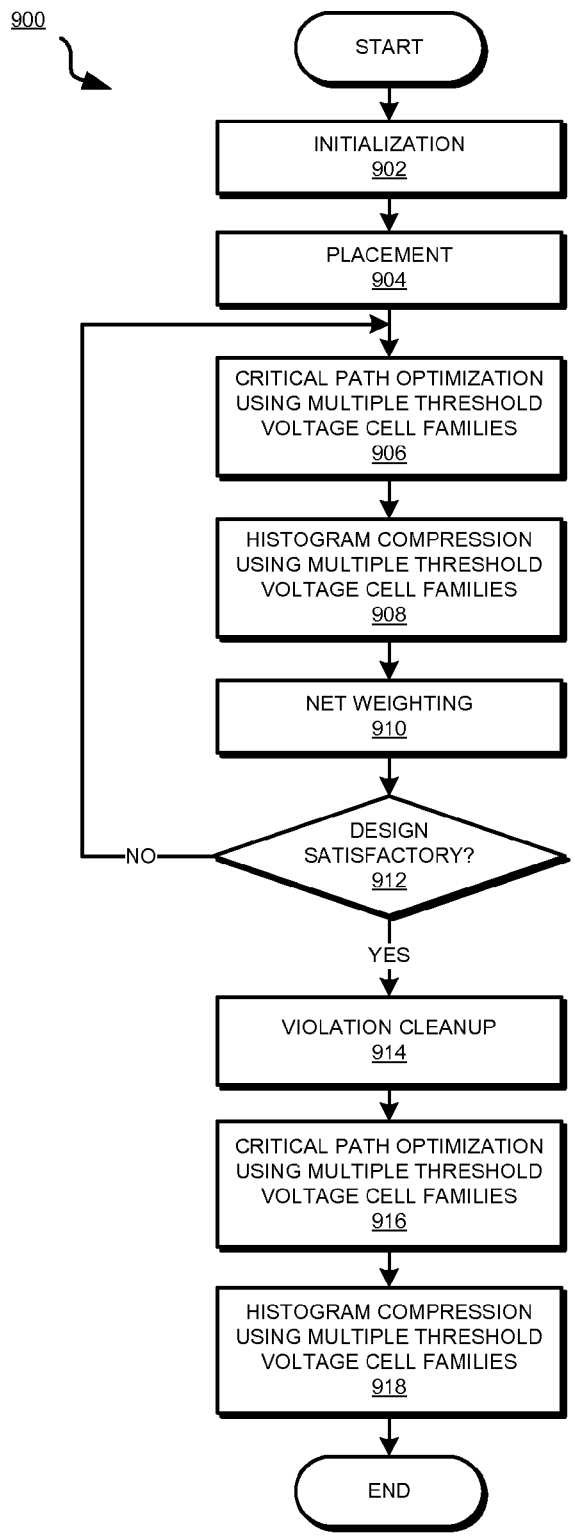
FIG. 9 depicts a flowchart of a physical synthesis process that is modified in accordance with an illustrative embodiment.

With reference to FIG. 9, this figure depicts a flowchart of a physical synthesis process that is modified in accordance with an illustrative embodiment. Process 900 is a detailed example variation of process 800 in FIG. 8, and may be similarly implemented.

Process 900 begins by the design initialization (step 902). Process 900 performs the placement operations (step 904).

Process 900 performs path optimization, including critical path optimization, using mVt families in the manner of step 804 in FIG. 8 (step 906). Process 900 performs design compression, including histogram compression, using mVt families in the manner of step 804 in FIG. 8 (step 908). Process 900 performs net weighting, a manipulation of nets to achieve desired timing characteristics in the circuit (step 910).

Process 900 determines whether the design is satisfactory (step 912). If the design is not satisfactory ("No" path of step 912), process 900 returns to step 906 for another iteration through steps 906-910.

If the design is satisfactory ("Yes" path of step 912), process 900 performs violation cleanup (step 914). Process 900 may further perform optimization, including critical path optimization, using mVt families (step 916). Process 900 may further performs design compression, including histogram compression, using mVt families (step 918). Process 900 may thereby produce, render, or publish a design in accordance with an illustrative embodiment for the circuit, and end thereafter.

The components in the block diagrams and the steps in the flowcharts described above are described only as examples. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for mVt families based integrated circuit design. Using the illustrative embodiments, a starting phase of an IC design process may incorporate cells from multiple cell families where some cell families have differing voltage thresholds from one another.

The design process according to an embodiment continues to use mVt families through the iterative process of modifying the design, ensuring that cells from multiple families remain in the design. The design process according to an embodiment may further alter the mix of cells from the various cell families during some iterations, for example, when enforcing budget constraints.

The illustrative embodiments provide several ways of modifying, transforming, altering, improving, changing, reconfiguring, re-placing, re-positioning, or otherwise manipulating objects including buffers and wires for routing of an IC design. The several ways of manipulating objects in a given placement can be combined, repeated, or used in isolation as may be suitable for a particular implementation. Furthermore, the depicted examples use buffer cells only for the clarity of the description and not as a limitation on the invention. Any type of cell from any cell family can be used or manipulated in a similar manner within the scope of the invention.

The illustrative embodiments may be implemented by modifying an existing IC design tool. The illustrative embodiments may also be implemented by having new applications, tools, or components thereof, operate in coordination with an existing IC design tool or a component thereof.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for incorporating multiple threshold voltage cell families (mVt families) in a design of an integrated circuit having cells, a cell including an electronic component, the computer implemented method comprising:

initializing, using a processor and a memory, a design process by using cells from the mVt families in the design;

including the cells from the mVt families in iterative manipulation of the design before a violation cleanup is initiated on the design;

further including the cells from the mVt families in the violation cleanup and subsequent steps of the design process; selecting a first number of cells from a first cell family in the mVt families, the first number not exceeding a budget for the first cell family in the design;

selecting a second number of cells from a second cell family in the mVt families;

using the first number of cells from the first cell family and the second number of cells from the second cell family in an iteration of the design process, and producing a version of the design usable to implement the circuit with the cells from the mVt families.

2. The computer implemented method of claim 1, further comprising:

selecting a third number of cells from the first cell family such that a combination of the first number of cells and the third number of cells present in the design does not exceed the budget for the first cell family in the design; and replacing a fourth number of cells of the second family in the design with the third number of cells from the first family.

3. The computer implemented method of claim 2, wherein the first cell family is a family of low threshold voltage cells, the second cell family is a family of high threshold voltage cells, and the replacing reduces a delay in a path in the design.

4. The computer implemented method of claim 2, wherein the first cell family is a family of high threshold voltage cells, the second cell family is a family of low threshold voltage cells, and the replacing reduces a leakage power amount in the design.

5. The computer implemented method of claim 1, wherein the design process is a physical synthesis process in an IC design tool executing in a data processing system.

6. The computer implemented method of claim 5, wherein the cells from the mVt families are used in optimization and compression steps of the physical synthesis process before the violations in the design are cleaned up.

7. The computer implemented method of claim 6, wherein the cells from the mVt families are also used in optimization and compression steps of the physical synthesis process after the violations in the design are cleaned up.

8. A computer usable program product comprising a computer usable storage device including computer usable code for incorporating multiple threshold voltage cell families (mVt families) in a design of an integrated circuit having cells, a cell including an electronic component, the computer usable code comprising:

computer usable code for initializing a design process by using cells from the mVt families in the design;

computer usable code for including the cells from the mVt families in iterative manipulation of the design before a violation cleanup is initiated on the design;

computer usable code for further including the cells from the mVt families in violation cleanup and subsequent steps of the design process; computer usable code for selecting a first number of cells from a first cell family in the mVt families, the first number not exceeding a budget for the first cell family in the design;

computer usable code for selecting a second number of cells from a second cell family in the mVt families; and computer usable code for using the first number of cells from the first cell family and the second number of cells from the second cell family in an iteration of the design process and computer usable code for producing a version of the design usable to implement the circuit with the cells from the mVt families.

9. The computer usable program product of claim 8, further comprising:

computer usable code for selecting a third number of cells from the first cell family such that a combination of the first number of cells and the third number of cells present in the design does not exceed the budget for the first cell family in the design; and computer usable code for replacing a fourth number of cells of the second family in the design with the third number of cells from the first family.

10. The computer usable program product of claim 9, wherein the first cell family is a family of low threshold voltage cells, the second cell family is a family of high threshold voltage cells, and the replacing reduces a delay in a path in the design.

11. The computer usable program product of claim 9, wherein the first cell family is a family of high threshold voltage cells, the second cell family is a family of low threshold voltage cells, and the replacing reduces a leakage power amount in the design.

12. The computer usable program product of claim 8, wherein the design process is a physical synthesis process in an IC design tool executing in a data processing system.

13. The computer usable program product of claim 12, wherein the cells from the mVt families are used in optimization and compression steps of the physical synthesis process before the violations in the design are cleaned up.

14. The computer usable program product of claim 13, wherein the cells from the mVt families are also used in optimization and compression steps of the physical synthesis process after the violations in the design are cleaned up.

15. The computer usable program product of claim 8, wherein the computer usable code is stored in a computer readable storage medium in a data processing system, and wherein the computer usable code is transferred over a network from a remote data processing system.

16. The computer usable program product of claim 8, wherein the computer usable code is stored in a computer readable storage medium in a server data processing system, and wherein the computer usable code is downloaded over a network to a remote data processing system for use in a computer readable storage medium associated with the remote data processing system.

17. A data processing system for incorporating multiple threshold voltage cell families (mVt families) in a design of an integrated circuit having cells, a cell including an electronic component, the data processing system comprising:
- a storage device, wherein the storage device stores computer usable program code; and
- a processor, wherein the processor executes the computer usable program code, and wherein the computer usable program code comprises:
    - computer usable code for initializing a design process by using cells from the mVt families in the design;
    - computer usable code for including the cells from the mVt families in iterative manipulation of the design before a violation cleanup is initiated on the design;
    - computer usable code for further including the cells from the mVt families in violation cleanup and subsequent steps of the design process; computer usable code for selecting a first number of cells from a first cell family in the mVt families, the first number not exceeding a budget for the first cell family in the design;
    - computer usable code for selecting a second number of cells from a second cell family in the mVt families; and
    - computer usable code for using the first number of cells from the first cell family and the second number of cells from the second cell family in an iteration of the design process and
    - computer usable code for producing a version of the design usable to implement the circuit with the cells from the mVt families.

* * * * *